United States Patent [19]
Huber et al.

[11] Patent Number: 6,076,430
[45] Date of Patent: Jun. 20, 2000

[54] ELECTRICAL TRANSMISSION RANGE SHIFT SYSTEM

[75] Inventors: Jon M. Huber, Laurinburg; Steven E. Radue, Southern Pines; Bryant K. McLaughlin, Laurinburg, all of N.C.; Fabian J. Dechant, Oil City, Pa.

[73] Assignee: Meritor Heavy Vehicle Systems, L.L.C., Troy, Mich.

[21] Appl. No.: 09/221,806

[22] Filed: Dec. 29, 1998

Related U.S. Application Data

[63] Continuation of application No. 08/997,716, Dec. 23, 1997.

[51] Int. Cl.[7] ................................................. F16H 59/04
[52] U.S. Cl. ........................................... 74/745; 74/335
[58] Field of Search ...................................... 74/745, 335

[56] References Cited

U.S. PATENT DOCUMENTS

| | | |
|---|---|---|
| 2,778,247 | 1/1957 | Perkins . |
| 4,428,248 | 1/1984 | Broucksou et al. ........................ 74/335 |
| 4,567,969 | 2/1986 | Makita ...................................... 74/335 |
| 4,974,474 | 12/1990 | Newbigging . |
| 5,172,603 | 12/1992 | MacInnis .................................. 74/335 |
| 5,172,604 | 12/1992 | Monette et al. . |
| 5,186,066 | 2/1993 | Pankratz et al. . |
| 5,193,410 | 3/1993 | Stine et al. . |
| 5,199,312 | 4/1993 | Huggins et al. . |
| 5,216,931 | 6/1993 | Hirsch et al. . |
| 5,218,878 | 6/1993 | Monette et al. . |
| 5,219,391 | 6/1993 | Edelen et al. ............................. 74/335 |
| 5,222,404 | 6/1993 | Stine . |
| 5,224,392 | 7/1993 | Hutchison et al. . |
| 5,231,895 | 8/1993 | Stine . |
| 5,251,503 | 10/1993 | Morris et al. ............................. 74/335 |
| 5,791,189 | 8/1998 | Newbigging .............................. 74/335 |

*Primary Examiner*—Dirk Wright
*Attorney, Agent, or Firm*—Howard & Howard

[57] ABSTRACT

A vehicle transmission assembly includes a main gear box and an auxiliary or range gear box. An electrical actuation device for effecting changes in the range gear box preferably includes a solenoid actuator associated with each of the range gear members. A switch, which is preferably provided on the shift lever handle, allows the driver of the vehicle to indicate a desire to make a change in the range gear box. The solenoid actuators are responsive to the electrical switch to effect the range shift. The electrical components replace pneumatic components and associated fittings and airlines used with some prior systems. A further feature of this invention is to include a synchronizer protection circuit that disables the solenoid actuators unless prescribed transmission conditions are met.

20 Claims, 5 Drawing Sheets

ELECTRICAL TRANSMISSION RANGE SHIFT SYSTEM

This is a continuation of co-pending application Ser. No. 08/997,716 filed on Dec. 23, 1997

BACKGROUND OF THE INVENTION

This invention generally relates a system including electrical actuators for changing gears within a vehicle transmission range gear box.

Heavy duty vehicle transmissions typically provide the ability to engage a large number of gear ratios for driving the vehicle. In many instances, a main transmission gear box houses a number of gear members that are selectively engaged to choose a particular gear ratio. An auxiliary or range gear box is often also provided to increase the number of available gear ratios. The range gear box typically includes one or more range gear members that are selectively engaged to operate the transmission in one of several ranges. A first range is typically associated with a number of lower gears such as a first gear through fifth gear, for example. When the range box is shifted into high range, then the same gears in the main gearbox that were used for first through fifth gear are now used for sixth through tenth gear, for example.

Pneumatic shift actuators generally have been used to effect a change of gears in the range gear box. Currently available pneumatic components shifting actuators include several shortcomings and drawbacks. A number of the pneumatic components associated with such systems are prone to contamination and are susceptible to developing air leaks. Such contamination or air leaks render the system inoperative or place it in a condition of poor performance, which requires repair or replacement.

Further, pneumatic components can be too slow under some circumstances. For example, when shifting into the high range, under some circumstances it is possible for the driver to complete the shift in the main gear box and begin to accelerate the vehicle before the range gear is fully engaged. This sequence of events is known in the art as "beating the range shift" and introduces the possibility for undesirable wear or damage to the transmission components.

This invention recognizes the problems and shortcomings associated with conventional transmission systems and provides an improved system. This invention provides a transmission control system that eliminates the need for some of the conventional components, which are subject to failure as discussed above, and utilizes an efficient system that is readily adapted to most heavy duty vehicle transmissions.

SUMMARY OF THE INVENTION

In general terms, this invention includes electrical actuators for effecting a gear change within the transmission range box. In the preferred embodiment, electrically powered solenoid actuators are utilized in place of selected pneumatic components and their associated air lines and fittings. The invention includes a shift switch, which can be conveniently located on the transmission shift lever, that enables the driver of the vehicle to select when a change in the range gear box is desired.

A transmission control device designed according to this invention has several basic components. A main gear box has a plurality of gears that are selectively engaged to achieve a desired gear ratio between a transmission input shaft and the range gear box input shaft. A range gear box has a range input shaft that is coupled to the transmission main gear box output shaft and an output shaft that drives the wheels of the vehicle. The range gear box includes selectively engagable range gears. A shift lever is placed within the vehicle and moveable by a driver into a variety of positions that correspond to a desired change in the gear ratio of the main gear box. A range switch, which can be mounted on the shift lever, is operable by the driver of the vehicle to indicate a desired engagement of one of the range gears. An electrical actuation device within the range gear box is responsive to the range switch to effect the desired engagement of the range gears.

In a further enhancement of this invention, a control circuit is included that protects the components of the range gear box by disabling the electrical actuation device unless certain conditions are met. The electrical actuation device will only be energized when the transmission is in a neutral state and when it is feasible to effect the change in the range gear box.

The various features and advantages of this invention will become apparent to those skilled in the art from the following detailed description of the currently preferred embodiment. The drawings that accompany the detailed description can be described as follows:

DETAILED DESCRIPTION OF THE PREFERRED EMBODIMENT

Figure 1:
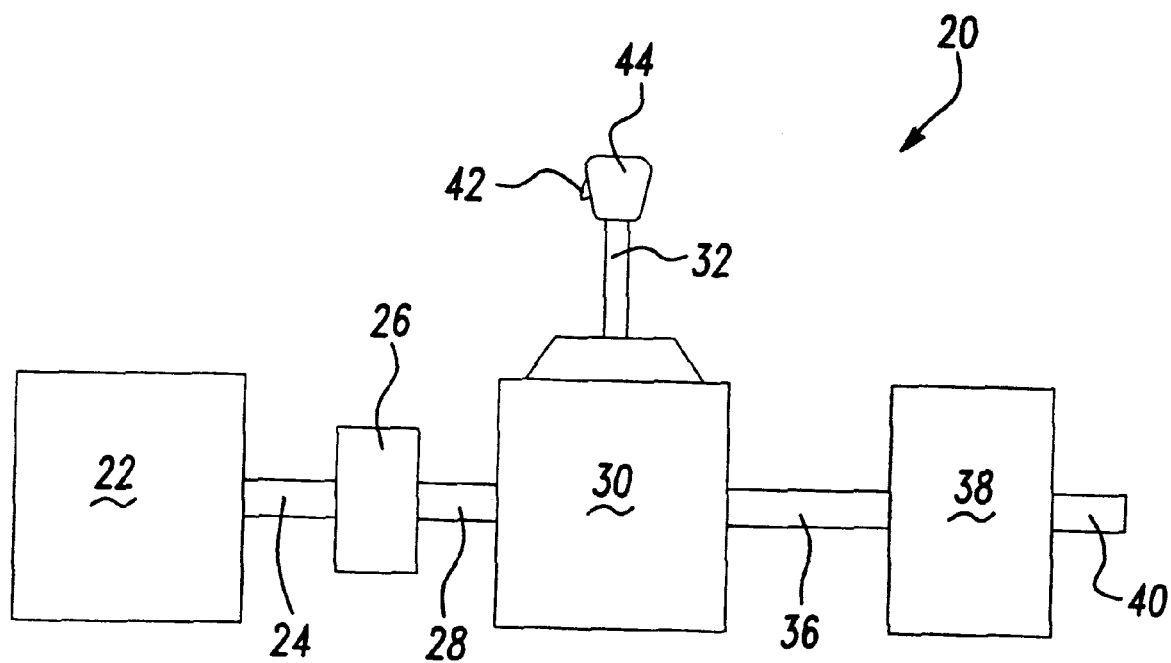
FIG. 1 is a schematic illustration of a transmission system.

FIG. 1 schematically illustrates a transmission assembly 20 for use in a heavy duty vehicle, for example. An engine 22 has an output shaft 24 that is selectively coupled through a master clutch 26 to an input shaft 28 of a transmission main gear box 30. The transmission main gear box 30 is any conventional transmission gear box. A shift lever 32 allows an operator or driver of the vehicle to selectively cause engagement between gear members within the main gearbox 30. In the currently preferred embodiment, the shift lever 32 is a manual stick shift lever. It should be noted, however, that a shift arrangement where a driver moves a shift lever to generate signals indicative of a desired gear change could also be used.

An output shaft 36 from the transmission main gear box 30 is input to a range gear box 38. The range gear box 38 provides the ability to operate the vehicle transmission in a high or low range, for example. The range box 38 preferably has a high range gear member and a low range gear member that are selectively engaged depending on the desired gear ratio. The output shaft 40 from the range gear box 38 is used to drive the wheels of the vehicle.

This invention includes an electrical actuation device that effects the gear changes within the range gear box 38. The shift lever 32 preferably includes a range switch 42 that is supported on the handle portion 44 of the shift lever 32. The range switch 42 allows the driver of the vehicle to indicate when a range shift is desired. The range switch 42 preferably is configured so that the driver can specify whether a shift into the high range or the low range is desired.

Figure 2:
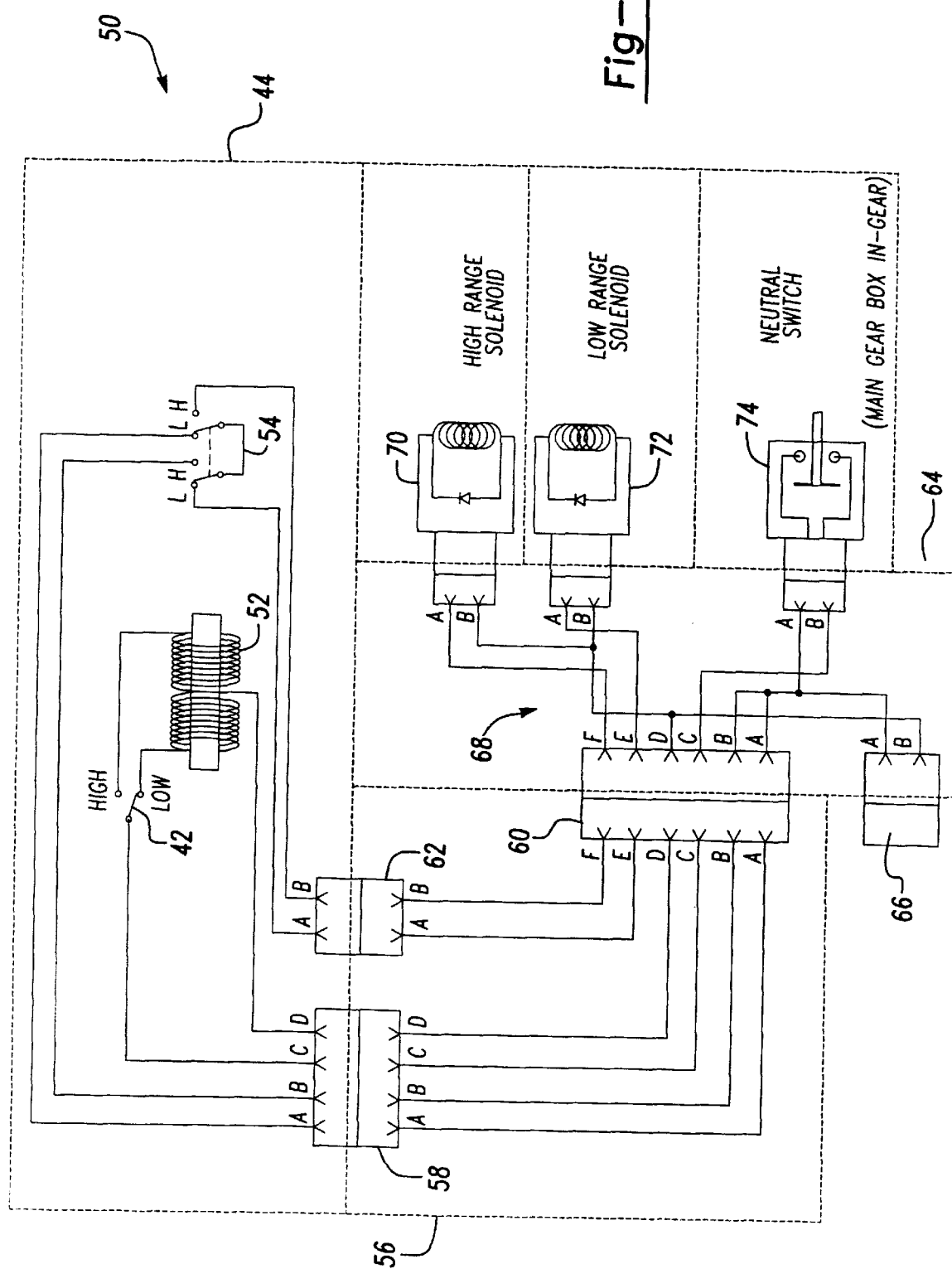
FIG. 2 is a schematic illustration of an electrical actuation system designed according to this invention.

FIG. 2 is a schematic diagram 50 of the currently preferred embodiment of this invention. The range shift switch 42 provides a signal to a latching relay having an energizing coil 52 and a responsive switch portion 54. As indicated in FIG. 2, the driver can selectively move the range shift switch 42 into a position indicating a desire to move the range gear box into the high or low range. The switch assembly 42 preferably is located within the shift lever handle 44. The portion of FIG. 2 outlined at 56 represents a portion of the shift lever wiring harness that is already present within most heavy duty vehicle transmission systems. A plurality of connector units 58, 60 and 62 provide a convenient and useful interface between the shift knob wiring harness 45 and a transmission wiring harness outlined at 64. The connectors 58, 60 and 62 can be any commercially available electrical connectors that provide the abilities for switching and selective energization as will be described in more detail below.

A power source, schematically illustrated as a battery connector 66, is associated with the typical vehicle wiring harness and provides electrical power to the various components of a system designed according to this invention. In the illustrated embodiment, A is the positive terminal and B goes to the negative terminal. The transmission wiring harness 64 includes a wiring arrangement 68 that, when used in connection with the range shift switch arrangement, allows selective energization of a first solenoid 70 or a second solenoid 72.

The first solenoid 70 preferably is associated with the high range gear member in the range gear box 38. The second solenoid 72 preferably is associated with the low range gear member. A significant advantage is provided by utilizing the solenoids 70 and 72. Each of the solenoids replace components that were purely pneumatic in prior art systems. The solenoids provide the movement or actuation within the range gear box 38 that will cause proper engagement of the selected range gear member.

The solenoids are wired through the connector portion 60 so that the solenoid 72 is activated or energized when the range shift switch 42 is in the position illustrated in FIG. 2, for example. This can be accomplished by a simple movement of the driver's thumb, for example.

A neutral switch 74 is included for indicating when the main gear box 30 is in neutral. The neutral switch 74 preferably is closed when the main gear box 30 is placed in neutral. The neutral switch 74 can be responsive, for example, to neutral within the main gear box 30. The wiring arrangement 68 and the operative function of the connector 60 insures that the solenoids 70 and 72 will only be energized when the neutral switch 74 is closed and the main gear box 30 is in a neutral condition. This insures that there is no attempt to engage the range gear members unless the transmission is in neutral.

The components schematically illustrated in FIG. 2 preferably replace the slave valve, pneumatic shift knob, and all related air lines and fittings that would otherwise be required in prior art systems. Therefore, this invention eliminates the use of some pneumatic components that can be undesirably slow in response to a driver's desire to effect a range shift. Moreover, pneumatic components introduce the possibility for defects and failures that do not exist when using electrical components as described in this specification. The electric shift knob, electrically controlled solenoids 70 and 72, the neutral switch 74 and the wiring harness 64 further provide the advantage of a compact, easy to assemble arrangement that is readily adapted to most transmissions. The range shift switch 42 allows the driver of the vehicle to pre-select a desired range shift prior to shifting the transmission to neutral. The actual range shift will occur only when the main gear box 30 is placed in neutral and neutral switch 74 closes. This provides the significant advantage of replacing complex mechanical interlock systems that are otherwise required with current pneumatic range shift actuators. Although not specifically illustrated, the arrangement of FIG. 2 could be modified to include an electrically controlled splitter shift system by adding another solenoid and preferably an additional electric switch on the shift knob 34.

Figure 3:
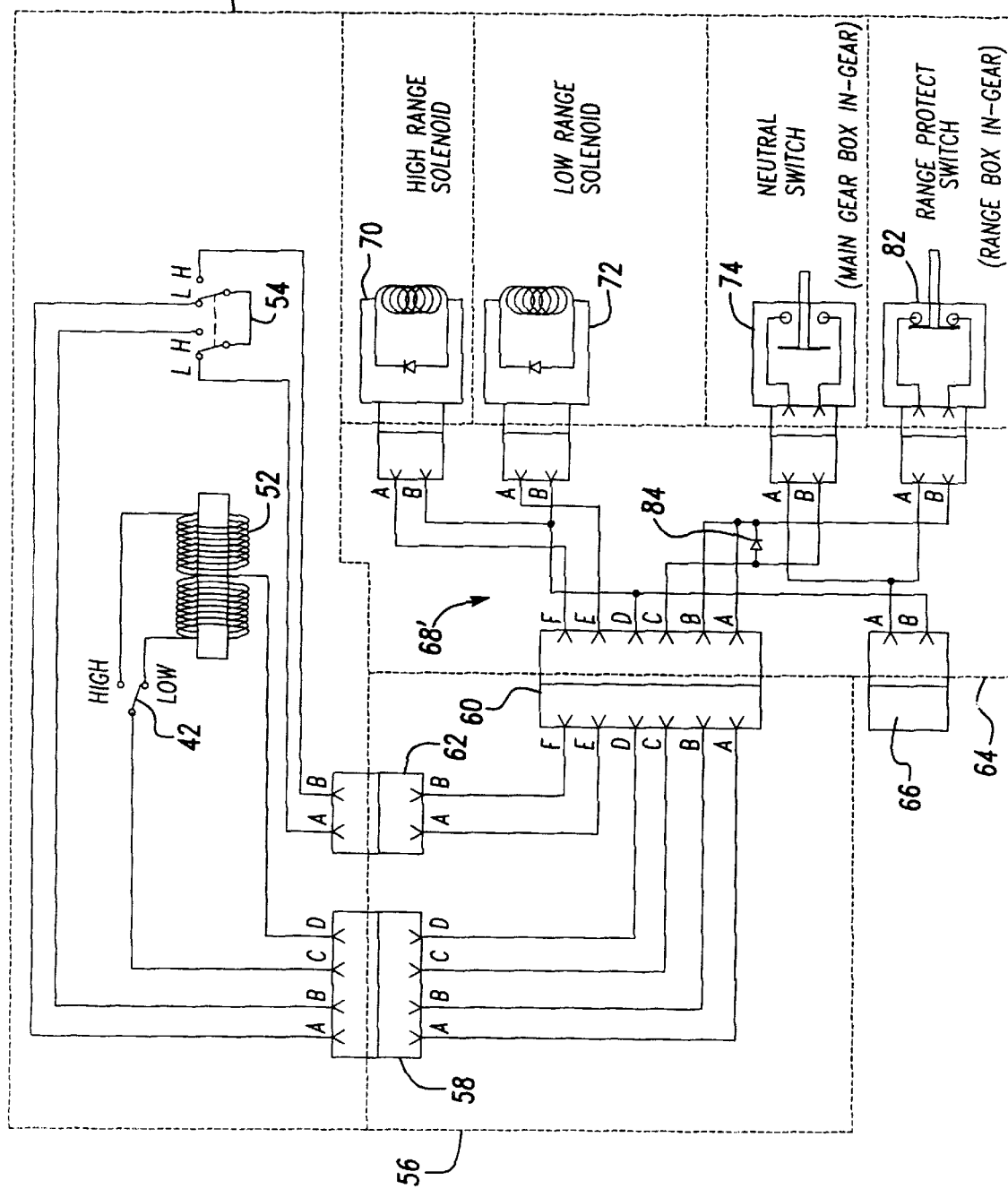
FIG. 3 is a schematic illustration of a modified version of the system shown in FIG. 2.

FIG. 3 illustrates an enhancement of the embodiment of FIG. 2. A range protect switch 82 is provided. The range protect switch 82 indicates when it is safe for, engaging one of the gear members within the range box 38. The circuitry 68' within the wiring harness 64 is slightly modified compared to that of FIG. 2. A diode 84 is added to interconnect the grounded terminals of the neutral switch 74 and the range protect switch 82. This arrangement, in combination with the connections through the connector 60 ensures that the solenoids 70 and 72 will only be activated when the transmission is in a neutral condition and the range protect switch 82 indicates that a range shift is possible.

Power to the solenoids 70 and 72 is supplied via the wires in the shift knob wiring harness 45, shift lever wiring harness 56, and transmission wiring harness 64. The range protect switch 82 is added to protect the low range, the high range, or both low and high range solenoids. No power is supplied to the protected circuit when the main gear box 30 is in gear and the range box 38 is not because power is only available when the range protect switch 82 is closed (i.e., when the range gear box 38 is in gear) and the neutral switch 74 is closed (i.e., when the main gear box 30 is in neutral).

The range protect switch 82 is open whenever the range box 38 is not in gear. For example, when the range box 38 is still shifting, the range protect switch 82 is opened and power to the solenoid is provided through the neutral switch 74. If the main box lever shift is completed, the neutral switch 74 opens and if the range shift is not complete then power is cut to the solenoid that is responsible for effecting the range shift. In this manner, the synchronizer is protected.

In the event that the range box has not completed its shift, the main gear box 30 must be returned to neutral so that neutral switch 74 can close and the range shift can be completed. When the range shift is complete, the switch 82 is closed. The solenoid remains powered and holds the range box in the selected gear range.

Figure 3A:
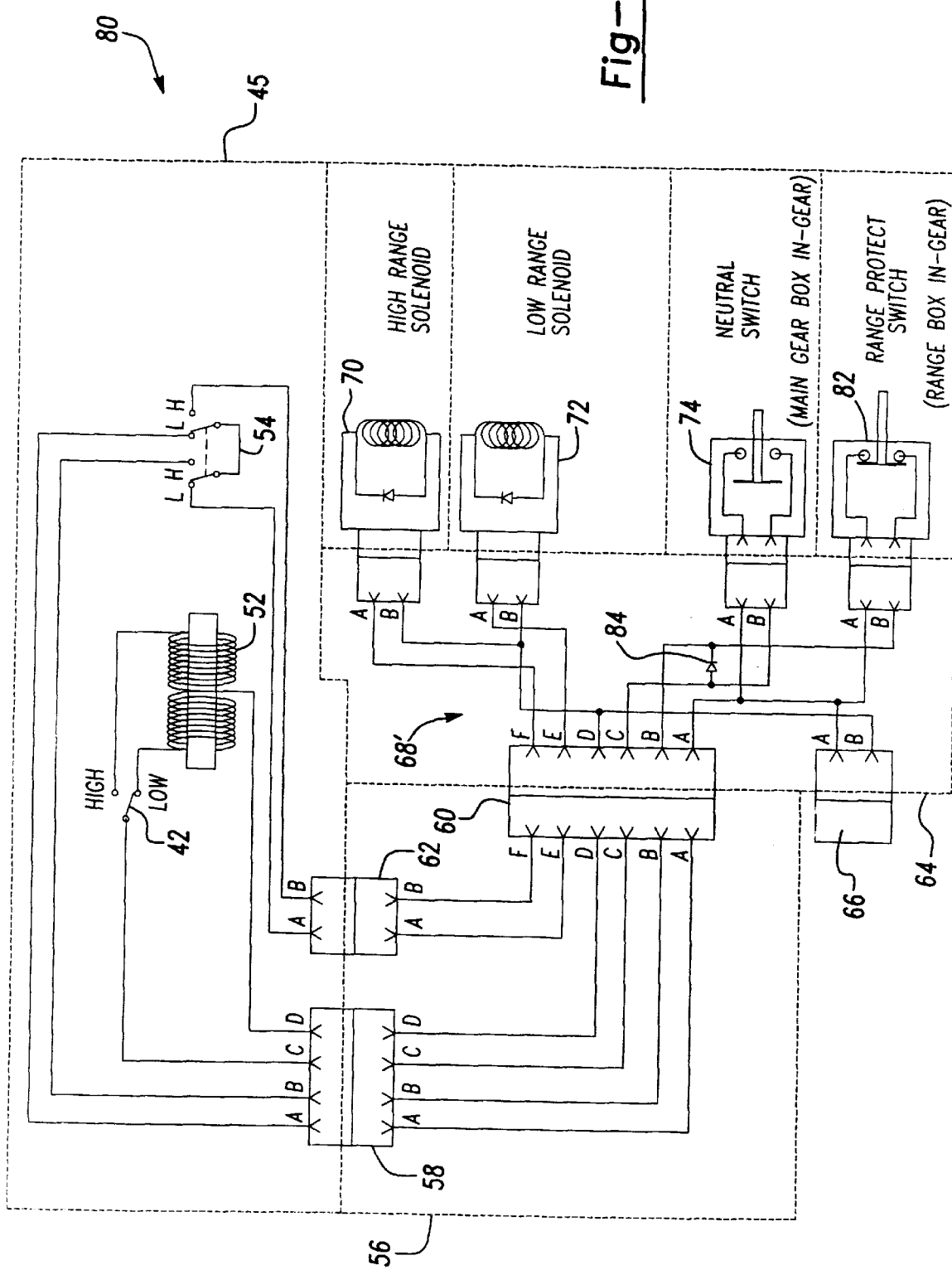
Figure 3B:
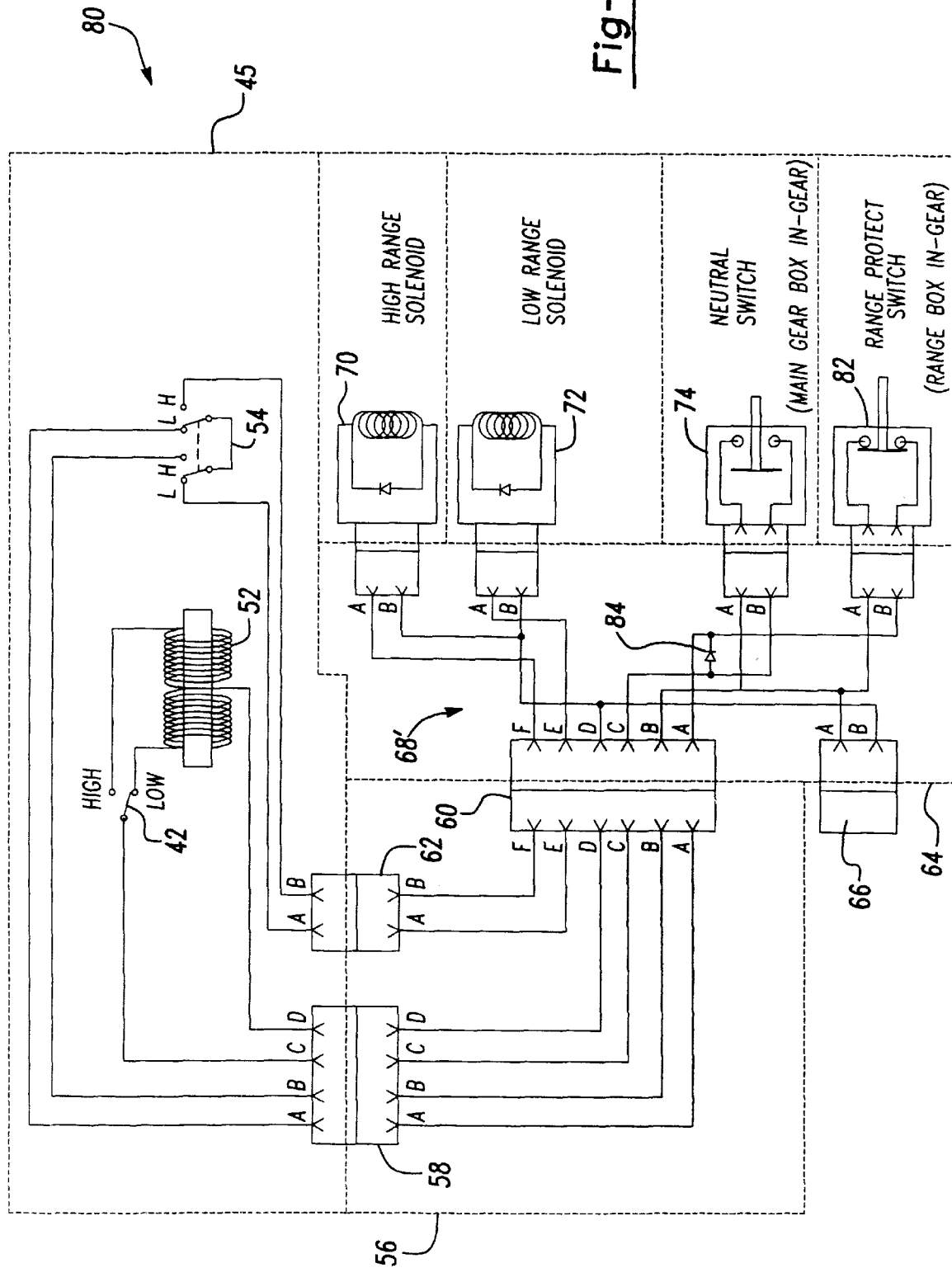

The embodiment illustrated in FIG. 3 is arranged to protect the high and low range synchronizer. The embodiment of FIG. 3A illustrates how the embodiment of FIG. 3 can be modified to protect only the high range synchronizer. The embodiment of FIG. 3b illustrates how the embodiment of FIG. 3 can be modified to protect only the low range syncronizer.

The range protect switch 82 provides the advantage of preventing synchronizer failures by disabling the appropriate solenoid(s). When the solenoids are disabled they cannot cause engagement of the selected range gear member. Therefore, high range synchronizer damage is prevented in the event that the operator attempts to accelerate the vehicle before the shift in the range box 38 is complete. This represents a significant difference compared to prior are systems where a pneumatic actuator continues to engage the synchronizer material despite the conditions of the main gear box 30 being engaged and a driver attempting to accelerate the vehicle. The synchronizer protection circuitry of this invention is also effective for protecting the synchronizers associated with engaging a low range gear, which may occur, for example, during a down-hill coast when the driver has the accelerator pedal released after having engaged the gears within the main gear box 30 before the synchronizers in the range gear box have completed the range shift.

Accordingly, this invention accounts for a synchronizer failure mode that is known to exist with current systems. Sometimes a discrepancy exists between the time required to complete range synchronization and the ability of a driver to shift the transmission main gear box faster than the automated components. This known failure mode is often referred to as a "beat range shift" and occurs most often when an operator of the vehicle fails to properly pre-select a range shift according to approved driving procedures or when some of the range shift system components do not perform at full capacity.

The combination of the neutral switch 74 and the range protect switch 82 acts as a range detector that indicates when the transmission is in a condition conducive to the selected range gear being engaged.

The preceding description is intended to explain this invention by way of example. Variations and modifications to the embodiments described above may become apparent to those skilled in the art. Such changes or additions, however, do not necessarily depart from the purview and spirit of this invention. The legal scope of protection given to this invention can only be determined by studying the following claims.

We claim:

1. A vehicle transmission assembly, comprising:
    a main gear box having a plurality of gears that are selectively engaged to effect a desired transmission gear ratio;
    a range gear box coupled to said transmission and including selectively engagable range gears;
    a shift lever that is movable to indicate a desired change in the gear ratio of said main gear box;
    a range switch that is operable by an operator of the vehicle to indicate a desired engagement of one of said range gears; and
    an electrical actuation device within said range gear box that is responsive to said range switch to effect selective engagement of said range gears.

2. The assembly of claim 1, wherein said electrical actuation device includes a solenoid.

3. The assembly of claim 1, wherein said range gears include a high range gear member and a low range gear member and said electrical actuation device includes a high range solenoid that effects engagement of said high range gear member and a low range solenoid that effects engagement of said low range gear member.

4. The assembly of claim 1, wherein said shift lever is a manual shift lever that is coupled to portions of said main gear box gears to manually effect changes in the gear ratio.

5. The assembly of claim 1, wherein said shift lever is coupled to a signal generator and said lever is moveable to generate electrical signals that are indicative of a desired gear change and said main gear box includes an actuation arrangement that effects the desired change responsive to said electrical signals.

6. The assembly of claim 1, wherein said electrical actuation device includes a solenoid actuator associated with each of said range gears.

7. The assembly of claim 6, wherein said range switch is operative to cause a selected one of said solenoids to be energized to thereby effect a desired engagement of said range gears.

8. The assembly of claim 7, wherein said range gears include a high range gear member and a low range gear member and said electrical actuation device includes a high range solenoid that effects engagement of said high range gear member responsive to appropriate actuation of said range shift switch and a low range solenoid that effects engagement of said low range gear member responsive to appropriate actuation of said range shift switch.

9. The assembly of claim 1, further comprising a neutral indicator associated with said transmission that indicates when said transmission is in a neutral condition and wherein said electrical actuation device is only responsive to said range shift switch when said neutral indicator indicates that said transmission is in said neutral condition.

10. The assembly of claim 1, further comprising a range detector that indicates when said transmission is in a condition conducive to said range gears being engaged and wherein said electrical actuation device is only responsive to said range shift switch when said range detector indicates that said conducive condition exists.

11. The assembly of claim 10, wherein said range detector is effective to disable said electrical actuation device whenever said conducive condition does not exist.

12. The assembly of claim 10, wherein said conducive condition includes said transmission main gear box being in neutral.

13. A method of effecting gear changes in a vehicle transmission assembly including a range gear box having a plurality of range gear members and an electrical actuator associated with the range gear members comprising the steps of:
    (A) indicating that a selected one of the range gear members should be engaged;
    (B) determining whether engagement of the selected range gear member is possible; and
    (C) activating the electrical actuator when engagement of the selected range gear member is possible until said selected range gear member is engaged or such engagement becomes no longer possible.

14. The method of claim 13, wherein step (A) is performed by manually manipulating a range selection switch.

15. The method of claim 13, wherein step (B) is performed by determining whether the transmission is in a neutral condition and wherein step (C) is performed only when the transmission is in a neutral condition.

16. The method of claim 13, wherein step (B) is performed by determining whether the transmission is in a neutral condition and determining whether a beat shift condition exists that includes gear members within a main gear box being engaged and the vehicle being accelerated and wherein step (C) is performed only when the transmission is in a neutral condition and the beat shift condition does not exist.

17. The method of claim 16, wherein step (C) is performed by the substep of deactivating the electrical actuator whenever the beat shift condition exists prior to the selected range gear member being fully engaged.

18. A system for controlling engagement of gear members within a vehicle transmission range box, comprising:
    a range box assembly including at least one selectively engagable gear member;
    a selection switch that is manually operable by a driver of the vehicle to indicate when engagement of the gear member is desired; and
    an electrically powered actuator supported within said range box assembly and operatively associated with said gear member to selectively engage said gear member responsive to operation of said switch.

19. The system of claim 18, further comprising a detector that detects whether the vehicle transmission is in a condition conducive to said range gear member being engaged and wherein said detector is operative to deactivate said electrically powered actuator whenever the transmission is not in said conducive condition.

20. The system of claim 18, wherein said range box assembly includes a high range gear member and a high range electrically powered actuator associated with said high range gear member, a low range gear member and a low range electrically powered actuator associated with said low range gear member, wherein said selection switch is operable to indicate which of said electrically powered actuators is to be activated and further comprising a protector device that is operative to disable said actuators whenever the transmission is in a predetermined condition.

* * * * *